US010205886B2

(12) United States Patent
Harada

(10) Patent No.: US 10,205,886 B2
(45) Date of Patent: Feb. 12, 2019

(54) IMAGING APPARATUS, CONTROL METHOD, AND STORAGE MEDIUM

(71) Applicant: CANON KABUSHIKI KAISHA, Tokyo (JP)

(72) Inventor: Yasuhiro Harada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/816,559

(22) Filed: Aug. 3, 2015

(65) Prior Publication Data
US 2016/0044223 A1 Feb. 11, 2016

(30) Foreign Application Priority Data

Aug. 7, 2014 (JP) .................................. 2014-161758

(51) Int. Cl.
 *H04N 5/235* (2006.01)
 *H04N 5/232* (2006.01)
(52) U.S. Cl.
 CPC ......... *H04N 5/2353* (2013.01); *H04N 5/2357* (2013.01); *H04N 5/23245* (2013.01)
(58) Field of Classification Search
 CPC ........ G03B 7/00; G03B 2207/00; G03B 9/58; H04N 5/235; H04N 5/353
 USPC ....... 348/226.1, 362; 396/449, 213; 352/141
 See application file for complete search history.

(56) References Cited

U.S. PATENT DOCUMENTS

| 2006/0152598 A1* | 7/2006 | Kawarada | H04N 5/23248 348/226.1 |
| 2009/0167911 A1* | 7/2009 | Takane | H04N 5/23248 348/296 |
| 2009/0174788 A1* | 7/2009 | Ise | H04N 5/23245 348/222.1 |
| 2010/0045819 A1* | 2/2010 | Pillman | H04N 5/235 348/226.1 |
| 2011/0242334 A1* | 10/2011 | Wilburn | H04N 5/2354 348/207.1 |
| 2011/0255786 A1* | 10/2011 | Hunter | H04N 5/21 382/190 |

(Continued)

FOREIGN PATENT DOCUMENTS

| JP | 2006-222935 A | 8/2006 |
| JP | 2009-105693 A | 5/2009 |
| JP | 2011-135185 A | 7/2011 |

*Primary Examiner* — Xi Wang
(74) *Attorney, Agent, or Firm* — Canon U.S.A., Inc. IP Division

(57) ABSTRACT

There is provided an imaging apparatus that can obtain a satisfactory image under a flickering light source while preventing lowering of a frame speed during consecutive image capturing. The imaging apparatus includes an image capturing unit, an acquisition unit to acquire information about a periodic change in light intensity from a subject, and a control unit to control exposure timing of the image capturing unit to the light. The control unit may control the exposure timing so that the image capturing unit is exposed in synchronization with a timing at which the light intensity from the subject becomes a first light intensity based on the acquired information. A period at or during which the light intensity from the subject becomes the first light intensity may be shorter than a change period of the light intensity from the subject based on the acquired information.

20 Claims, 8 Drawing Sheets

(56) References Cited

U.S. PATENT DOCUMENTS

2012/0081569 A1\* 4/2012 Yost ................... H04N 5/2353
          348/226.1
2013/0242143 A1\* 9/2013 Chen ................ H04N 5/23209
          348/241

\* cited by examiner

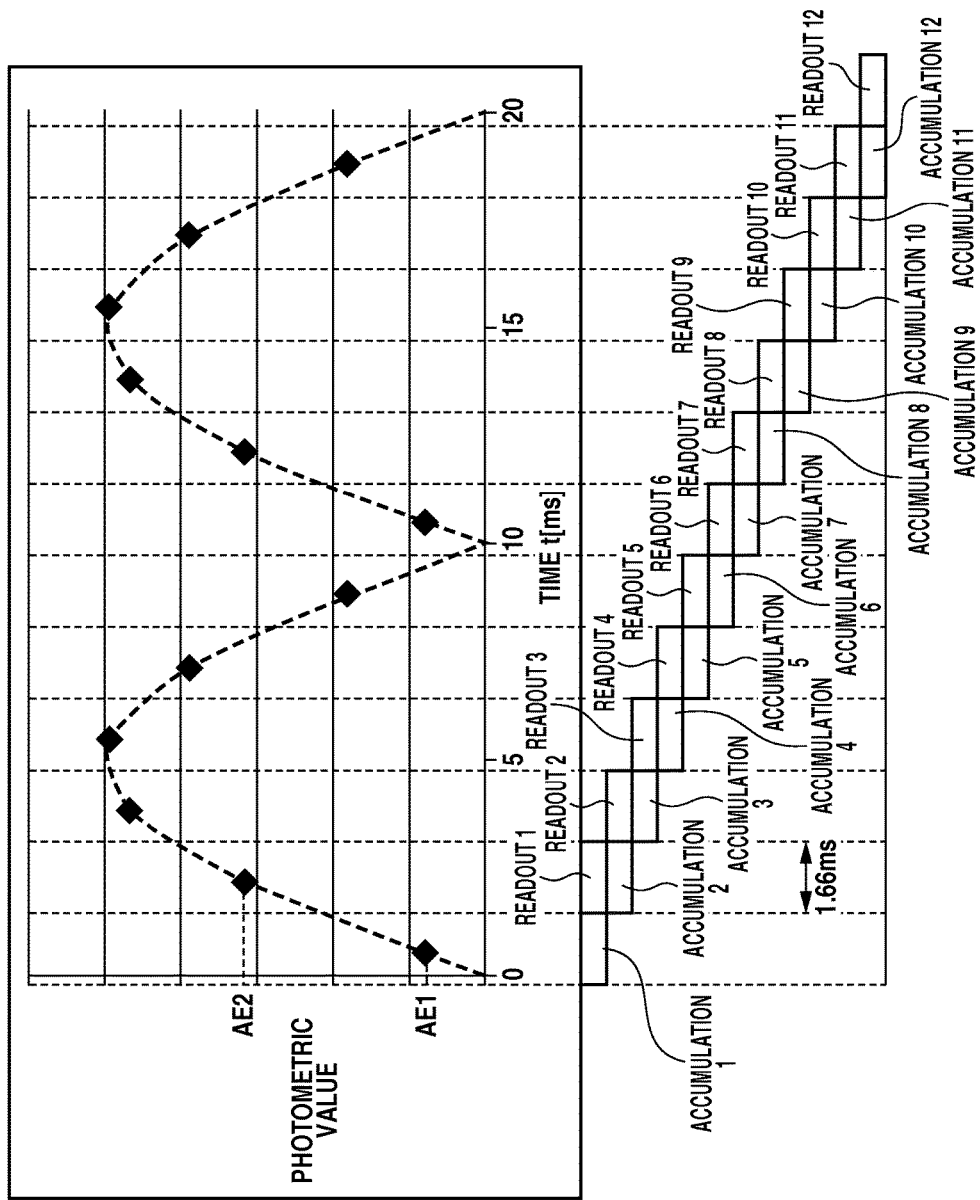

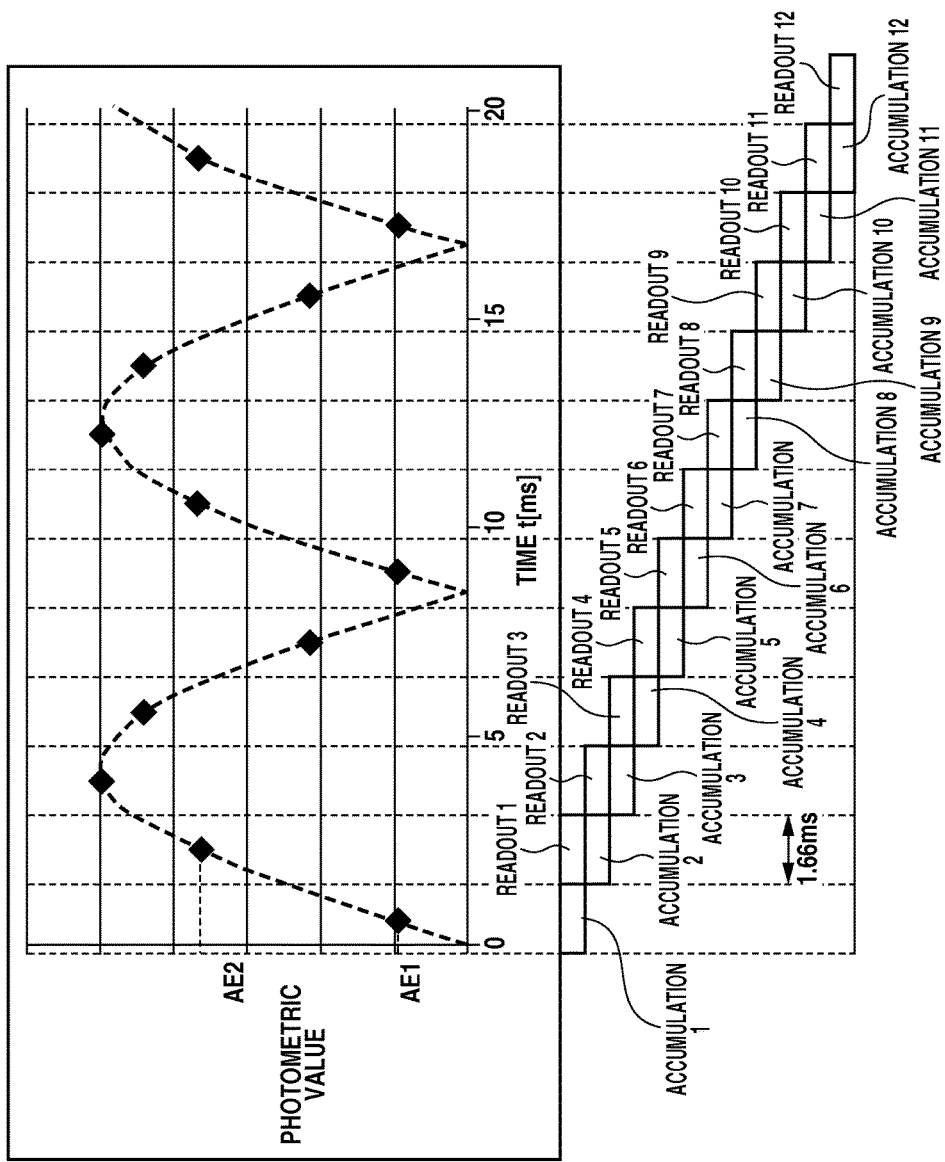

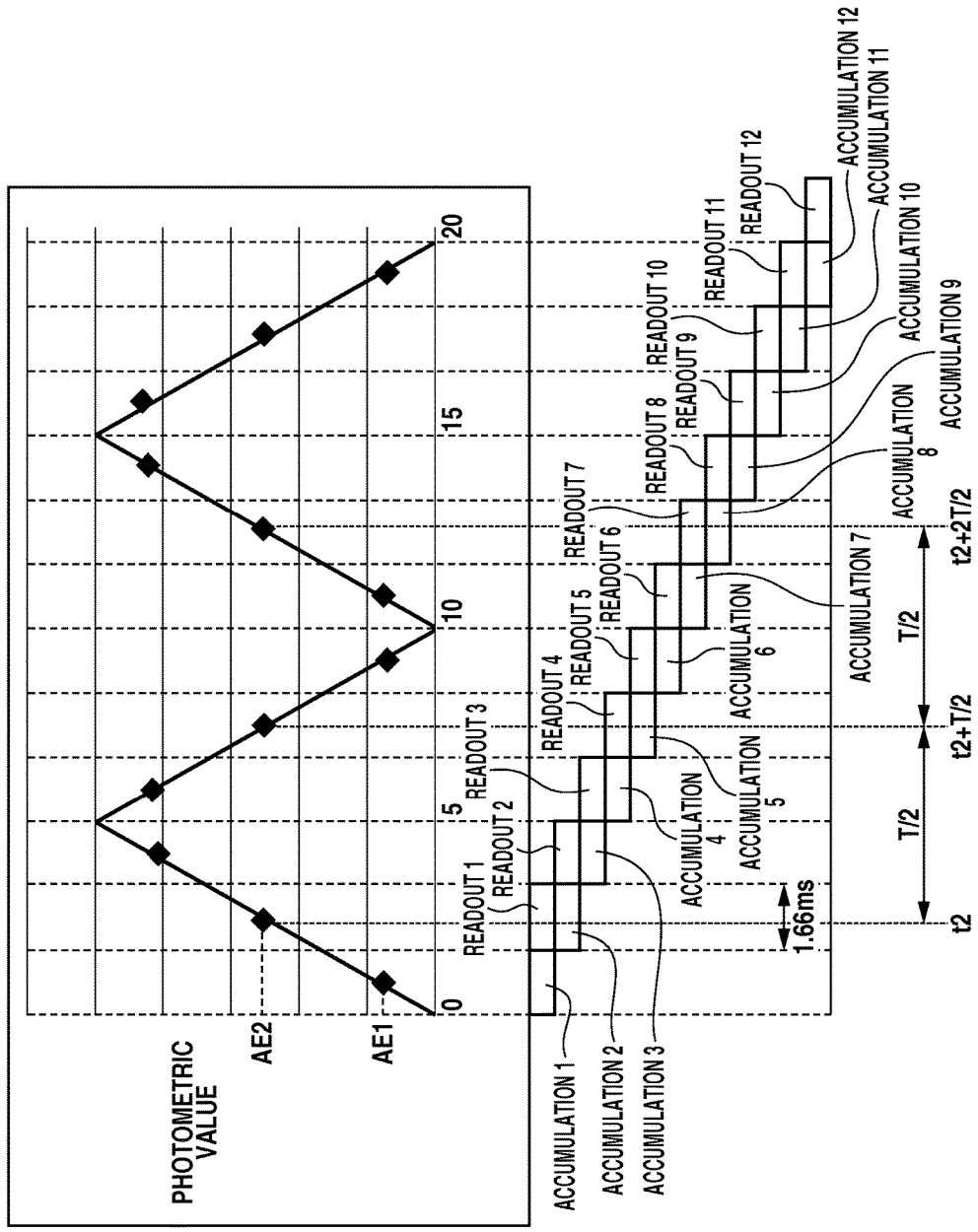

IMAGING APPARATUS, CONTROL METHOD, AND STORAGE MEDIUM

BACKGROUND OF THE INVENTION

Field of the Invention

The present inventions relate to an imaging apparatus, a control method therefor and one or more storage mediums, and more particularly relates to the imaging apparatus, the control method and one or more storage mediums that can control exposure of the imaging apparatus under a light source which flickers.

Description of the Related Art

Sensitivity of an imaging apparatus such as a digital camera, a mobile phone, and a tablet-type device has been improved recently. This has allowed the imaging apparatus to obtain a bright image with less blur even in a darker environment such as indoors by capturing an image with a high shutter speed (i.e., shorter exposure time).

Fluorescent lamps and light emitting diodes (LEDs), which have proliferated as indoor light sources, produce flickers. This is a phenomenon where illuminating light blinks periodically according to the frequency of a commercial power supply. When images are captured with a high shutter speed under the light source which flickers (hereinafter referred to as a flickering light source), unevenness of exposure and non-uniformity of color may occur in one captured image, and variation in exposure and color temperature may occur among a plurality of images that are captured consecutively.

In order to address such problems, Japanese Patent Application Laid-open No. 2006-222935 has discussed a technique to detect a flicker state of illumination light and to adjust timing of image capturing so that the center of an exposure period is substantially aligned with the timing at which the light intensity of the illumination light becomes maximum.

When a timing of capturing an image is adjusted so as to match a timing at which the light intensity of the illumination light becomes maximum as discussed in Japanese Patent Application Laid-open No. 2006-222935, a release time lag occurs depending on a timing to issue an instruction to capture an image. This results in decreasing frame speed during consecutive image capturing.

SUMMARY OF THE INVENTION

The present inventions are directed to an imaging apparatus capable of obtaining satisfactory images under a light source that flickers while preventing frame speed from decreasing during consecutive image capturing, one or more control methods for an imaging apparatus and one or more storage mediums.

According to an aspect of the present inventions, an imaging apparatus includes an image capturing unit, an acquisition unit configured to acquire information about a periodic change in light intensity from a subject or an object, and a control unit configured to control exposure timing of the image capturing unit to the light, wherein, when consecutive image capturing is performed and each of a plurality of images is captured during the consecutive image capturing, the control unit controls exposure timing of the image capturing unit so that the image capturing unit is exposed in synchronization with a timing at which the light intensity from the subject or the object becomes a first light intensity based on the information acquired by the acquisition unit, and wherein a period at or during which the light intensity from the subject or the object becomes the first light intensity is shorter than a change period of the light intensity from the subject or the object based on the information acquired by the acquisition unit.

According to other aspects of the present inventions, one or more additional imaging apparatuses, one or more control methods therefor and one or more computer-readable storage mediums are discussed herein. Further features of the present inventions will become apparent from the following description of exemplary embodiments (with reference to the attached drawings).

BRIEF DESCRIPTION OF THE DRAWINGS

FIGS. 3A and 3B each illustrate a relationship between a charge accumulation control and photometric values.

FIG. 7 illustrates photometric values under a flickering light source of which the light intensity fluctuates in a triangular wave pattern.

DESCRIPTION OF THE EMBODIMENTS

Various exemplary embodiments, features, and aspects of the inventions will be described in detail below with reference to the drawings.

Figure 1:
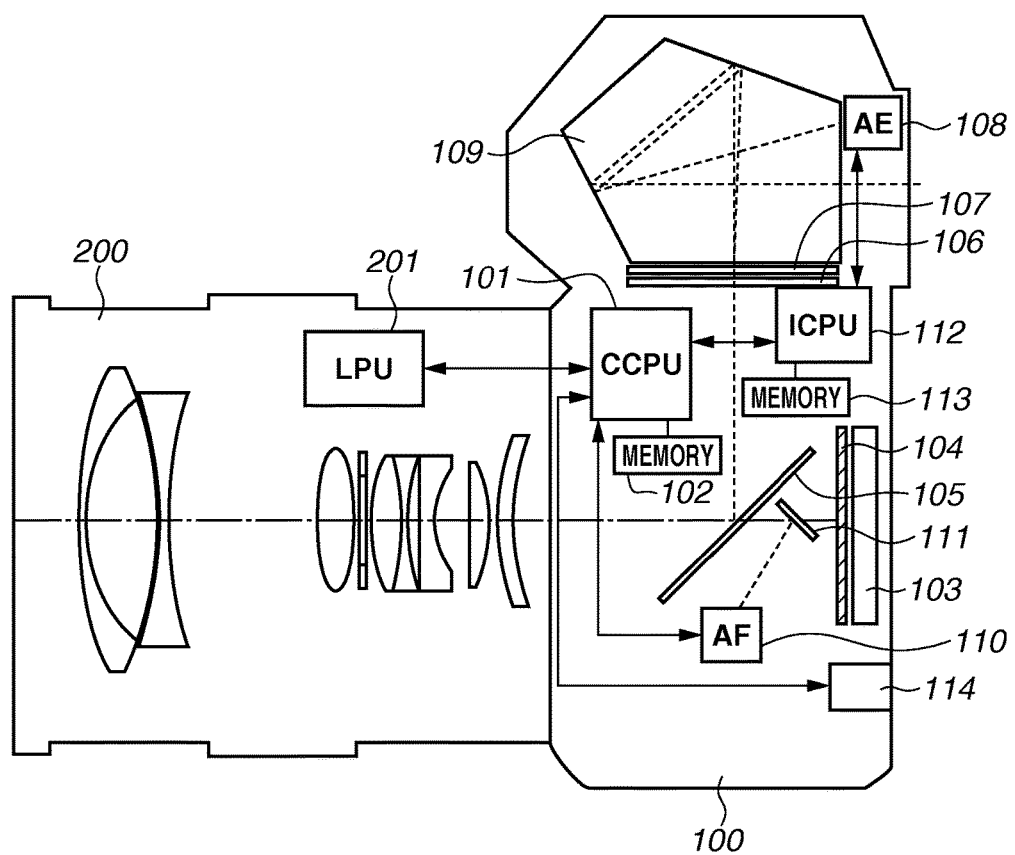
FIG. 1 illustrates a schematic structure of an imaging apparatus according to an exemplary embodiment of the present inventions.

FIG. 1 illustrates a schematic structure of an imaging apparatus according to a first exemplary embodiment of the present inventions. This imaging apparatus includes a camera body 100 and a lens unit 200 detachably mounted to the camera body 100.

A configuration of the camera body 100 will now be described. A microcomputer (hereinafter referred to as camera central processing unit (CCPU)) 101 controls each unit in the camera body 100. A memory 102 includes random access memory (RAM) and read only memory (ROM), which are connected to the CCPU 101.

An image sensor 103 serving as an image capturing unit includes, for example, a charge-coupled devices (CCD) sensor or a complementary metal-oxide semiconductors (CMOS) sensor, and further includes an infrared cut-off filter and a low-pass filter, which photo-electrically converts incident light flux via the lens unit 200 to output image signals.

A shutter 104 moves between a light-blocked state in which the incident light flux via the lens unit 200 is blocked from being introduced to the image sensor 103 and a retracted state in which the incident light flux via the lens unit 200 is introduced to the image sensor 103. In other words, the shutter 104 can change the state thereof between a first state for blocking light from being introduced to the image sensor 103 and a second state for not blocking light. The shutter 104 functions as an adjuster for adjusting an exposure period of the image sensor 103. In addition, the shutter 104 may be configured by using a so-called electronic shutter function that the CCPU 101 controls a charge accumulation period of the image sensor 103 in order to adjust the exposure period thereof.

A half mirror 105 can move between a position at which the incident light flux via the lens unit 200 is guided to the image sensor 103 (mirror-up state), and a position at which the incident light flux via the lens unit 200 is guided to a photometric sensor 108 (mirror-down state). In other words, the half mirror 105 changes the path of the incident light flux via the lens unit 200 between the state of guiding the light flux to the image sensor 103, and the state of guiding the light flux to the photometric sensor 108. In the state of guiding the light flux to the photometric sensor 108, the incident light flux via the lens unit 200 is also focused on a focusing screen 106 to form an image.

A display unit 107 is a display device including P-N crystal and the like. The display unit 107 displays items including a frame that indicates a focus detection region (AF frame) to be used for automatic focusing control (AF control). As the photometric sensor (AE sensor) 108, a charge-accumulation-type image sensor such as a CCD sensor and a CMOS sensor that can accumulate charge generated in proportion to an input amount of light is used. Thus, the photometric sensor 108 can perform not only photometric sensing but also face detection, object tracking, and flickering detection based on the image signal output from the photometric sensor. In addition, the flicker detection may be performed with output signals from the image sensor 103 instead of the image signals output from the photometric sensor 108.

A pentagonal prism 109 guides the incident light flux, which has entered via the lens unit 200 and has been reflected by the half mirror 105, to the photometric sensor 108 and also to an optical viewfinder (not illustrated). A focus detection circuit 110 performs focus detection for AF control. An AF mirror 111 guides a portion of the incident light flux, which has entered via the lens unit 200 and passed through the half mirror 105, to the focus detection circuit 110.

A ICPU 112 is a CPU used for drive control of the photometric sensor 108 and image processing and calculation. The ICPU 112 performs various calculations relating to photometry, and face detection and object tracking based on the output signals (image signals) from the photometric sensor 108. Further, ICPU 112 calculates, based on the output signals (image signals) from the photometric sensor 108, change characteristics of light intensity including a change period of light intensity of a subject and a timing at which the light intensity satisfies a predetermined condition (for example, a timing at which the light intensity becomes maximum or minimum). A memory 113 includes a random access memory (RAM) and a read only memory (ROM) that are connected to the ICPU 112. Incidentally, this exemplary embodiment provides a configuration in which the ICPU 112 and the CCPU 101 are separately equipped. The CCPU 101, however, may execute the functions that ICPU 112 performs.

An operation unit 114 includes a release button with which a user instructs the camera body 100 to start a preparatory operation for image capturing or to start an image capturing operation, and also includes setting buttons with which the user changes various settings of the camera body 100. The operation unit 114 includes a power switch with which the user switches ON/OFF of the power of the camera body 100 and a mode dial or a touch panel with which the user selects a mode from a plurality of image capturing modes of the camera body 100.

Now, a configuration of the lens unit 200 will be described. A lens CPU (hereinafter referred to as LPU) 201 controls each portion of the lens unit 200 such as a focus lens, a zoom lens, and an aperture drive unit. The LPU also sends information about the lenses to the CCPU 101.

Figure 2:
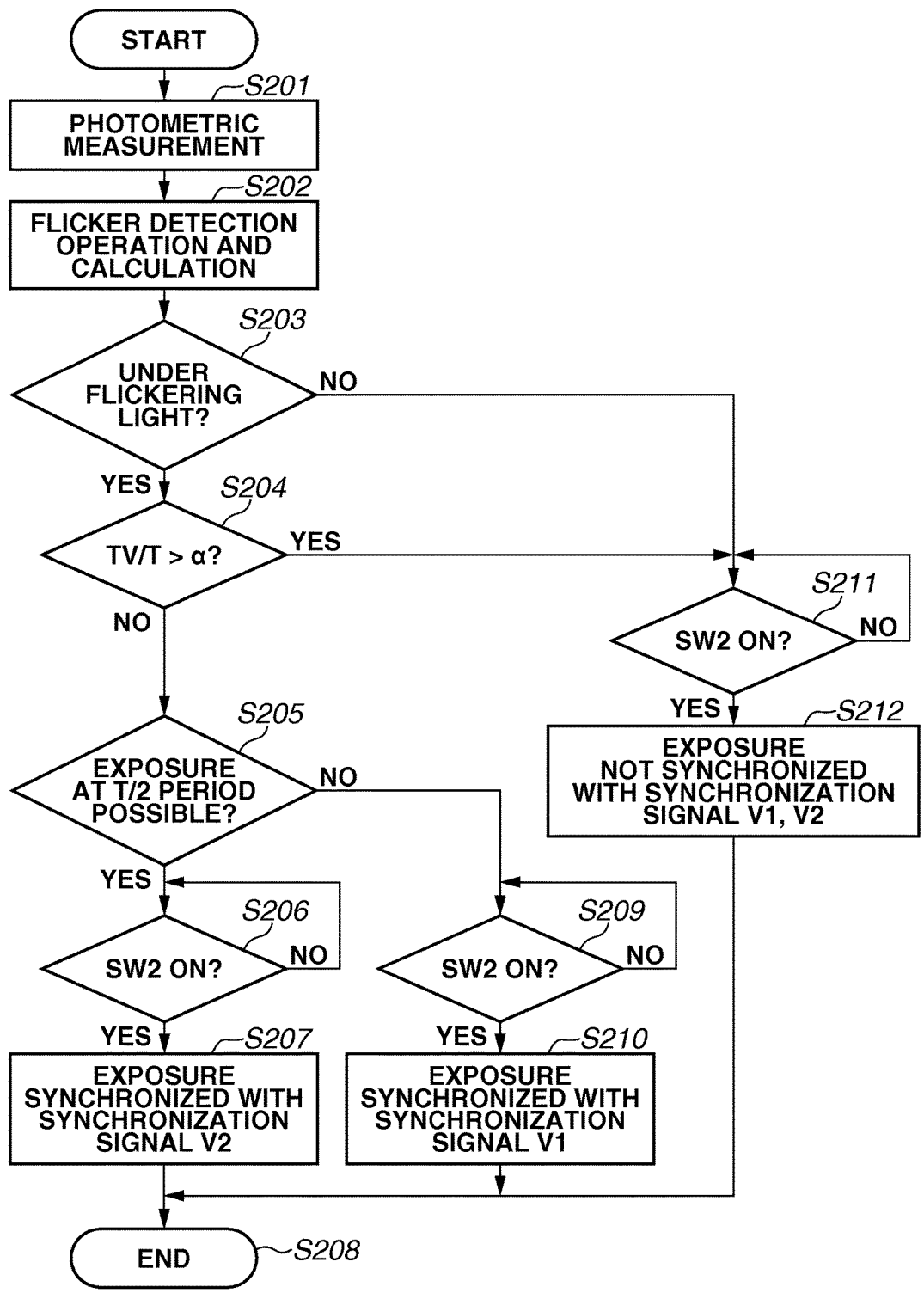
FIG. 2 is a flowchart illustrating an exposure timing determination process when an imaging apparatus captures an image while reducing influence of flickering according to an exemplary embodiment of the present inventions.

Now, an exposure timing determination process for image capturing while reducing influence of flickering will be described with reference to FIG. 2. FIG. 2 is a flowchart illustrating the exposure timing determination process of when an imaging apparatus captures an image while reducing influence of flickering according to the present exemplary embodiment. In the following description, a CMOS sensor is used as the image sensor 103 which employs so-called a rolling shutter system in which the exposure timing for each portion in an imaging area of the CMOS sensor is made different.

The photometric sensor 108 starts performing an photometric operation in step S201 when photometry is enabled by turning on the power switch of the camera body 100 or by turning on SW1 by pressing the release button halfway. More particularly, a charge accumulation period of the photometric sensor 108 may preferably be set to an integral multiple of a period of flickering in order to avoid change of photometric values due to change of light intensity under a flickering light source. The frequency in which the light intensity of the flickering light source fluctuates (hereinafter referred to as flicker frequency) is twice of that of commercial power supply. Therefore, if the frequency of the commercial power supply is 50 Hz, then the flicker frequency becomes 100 Hz. The change period of light intensity is the inverse of the flicker frequency, i.e., 10 ms. In the same way, the flicker frequency becomes 120 Hz in areas where the frequency of commercial power supply is 60 Hz and the change period of light intensity is 8.33 ms as the inverse of the flicker frequency. In order to respond to two different flicker frequencies, a charge accumulation period of the photometric sensor 108 is set substantially equal to an average of 10 ms and 8.33 ms, for example, 9 ms. Consequently, the charge accumulation period of the photometric sensor 108 becomes approximately equal to one change period of light intensity of the flickering light source even if the frequency of a commercial power supply is 50 Hz or 60 Hz. This enables stable photometric measurement results to be obtained even under a flickering light source. More specifically, stable photometric measurement results can also be obtained by performing measurements with a charge accumulation period (predetermined photometric period) being substantially equal to an integral multiple of one change period of light intensity of a flickering light source (i.e., an integral multiple of the inverse of two times of the commercial power supply frequency).

Based on the obtained photometric value, the CCPU 101 sets exposure conditions including an aperture value AV, a shutter speed (exposure period) TV, and an ISO sensitivity (imaging sensitivity) SV. AV, TV, and ISO are set by using a program diagram (not shown) stored in the memory 102 in advance. In addition, at least one exposure condition may be set according to a user's operation with the operation unit 114.

In step S202, the ICPU 112 subsequently performs a flicker detection operation and a flicker detection calculation. The flicker detection calculation is a process for calculating, based on the output signals (image signals) from the photometric sensor 108, change characteristics of light intensity including a change period of light intensity from a subject and a timing at which the light intensity satisfies a predetermined condition.

In step S202, the photometric sensor 108 performs, for example, a charge accumulation of a period of 1.66 ms, times consecutively 1.66. FIG. 3A illustrates an example relationship between charge accumulation control and photometric values under a flickering light source with a commercial power supply frequency of 50 Hz. In the following description, accumulation(n) represents the nth charge accumulation. In the same way, readout(n) represents the nth readout of the result from accumulation(n), and AE(n) represents a photometric value obtained from the result of readout(n). Acquisition time (acquisition timing) of each photometric value is represented by the center of a charge accumulation period that has a finite length of time, which is expressed as t(n) at which AE(n) is acquired. Although only the plots of n=1 and n=2 are indicated in FIG. 3A, the same applies to plots of n=3 to n=12 as well.

In FIG. 3A, the change period of light intensity of the light source is 10 ms, and 10 ms divided by 1.66 ms is approximately 6. Therefore, approximately the same photometric value is obtained at every 6 times of the charge accumulation as illustrated in FIG. 3A. In other words, AE(n)=AE(n+6) substantially applies.

Similarly, a change period of light intensity under a flickering light source with a commercial power supply frequency of 60 Hz is 8.33 ms, and 8.33 ms divided by 1.66 ms is approximately 5. As illustrated in FIG. 3B, approximately the same photometric value is therefore obtained at every 5 times of charge accumulation, and AE(n)=AE(n+5) substantially applies. On the other hand, AE(n) is constant, independent of n, in an environment without any flickering light source. It should be noted that above description is performed under the assumption that the light intensity of ambient light does not fluctuate except for flickering light sources. As described above, an evaluation value is calculated by using Equation (1) and (2) below based on a plurality of photometric values obtained from the charge accumulations for flicker detection.

$$F50 = \sum_{n=1}^{6} |AE(n) - AE(n+6)| \quad (1)$$

$$F60 = \sum_{n=1}^{6} |AE(n) - AE(n+5)| \quad (2)$$

Flickering is detected by comparing evaluation values F50 and F60 that are calculated with the Equations (1) and (2) respectively with a predetermined threshold value F_th.

More specifically, if F50<F_th and F60<F_th are satisfied, a plurality of photometric values obtained from charge accumulations for flicker detection can be regarded as almost the same, and therefore flickering is determined not to have been generated. If F50<F_th and F60≥F_th are satisfied, a plurality of photometric values obtained from charge accumulations for flicker detection can be approximately the same at every 6 times of the accumulation and are not approximately the same at every 5 times. Accordingly, flickering with the change period of light intensity of 10 ms (i.e., under a flickering light source with the commercial power supply frequency of 50 Hz) is determined to have been generated. If F50≥F_th and F60<F_th are satisfied, a plurality of photometric values obtained from charge accumulations for flicker detection can be approximately the same at every 5 times of the accumulation and are not approximately the same at every 6 times. Accordingly, flickering with the change period of light intensity of 8.33 ms (under a flickering light source with the commercial power supply frequency of 60 Hz) is determined to have been generated.

There may exist a case where F50≥F_th and F60≥F_th are satisfied when, for example, a user moves the imaging apparatus for panning or a subject moves during accumulation operation for the flicker detection, and then photometric values fluctuate considerably. In such a case, F50 is compared with F60 for flicker detection. More specifically, if F50≥F_th and F60≥F_th and F50≤F60 are satisfied, flickering with the change period of light intensity of 10 ms (i.e., under a flickering light source with the commercial power supply frequency of 50 Hz) is determined to have been generated. On the other hand, if F50≥F_th and F60≥F_th and F50>F60 are satisfied, flickering with the change period of light intensity of 8.33 ms (i.e., under a flickering light source with the commercial power supply frequency of 60 Hz) is determined to have been generated. More particularly, if F50≥F_th and F60≥F_th and F50=F60 are satisfied, a change period of light intensity from a flickering light source cannot be determined. In this case, flickering may be determined not to have been generated or not to have been detectible.

In addition, a change period of light intensity from a flickering light source is determined in the case where F50≥F_th and F60≥F_th. The accuracy of flicker detection, however, is low when F50≥F_th and F60≥F_th are satisfied. In this case, the charge accumulation for flicker detection may be redone.

Further, in step S202, the ICPU 112 generates synchronization signal V1 that is synchronized with a peak timing of the change of light intensity of the flickering light source. The peak timing of the change of light intensity of the flickering light source is calculated, for example, by interpolating a plurality of photometric values obtained by performing 12 times charge accumulations as previously described.

Figure 4A:
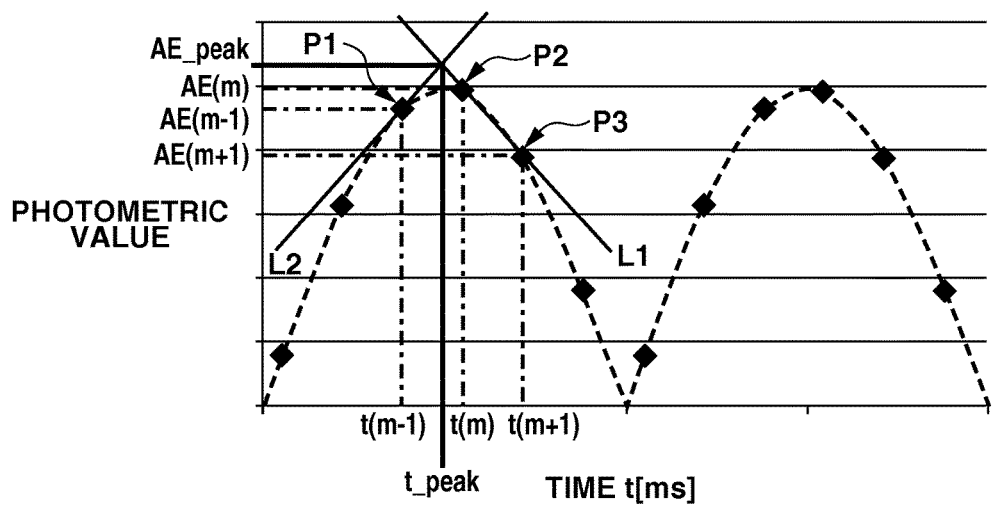
FIGS. 4A and 4B illustrate a method for calculating a peak timing in change of light intensity of a flickering light source.

FIG. 4A illustrates an example method for calculating the peak timing. A point having a maximum value among AE(2) to AE(11) is represented by P2(t(m), AE(m)), and the one point before and the one point after in photometric results are represented by P1(t(m−1), AE(m−1)) and P3(t(m+1), AE(m+1)), respectively. Further, an equation of straight line, L1=at+b, that passes through the point P2 and the point having smaller value between AE(m−1) and AE(m+1) (i.e., P3 in an example in FIG. 4) is calculated, and then another line that has a gradient −a and passes through the point having larger value between AE(m−1) and AE(m+1) (i.e., P1 in an example in FIG. 4) is represented by L2. The peak timing t_peak and the peak photometric value AE_peak that corresponds to the peak timing of the light intensity can be obtained by calculating the point of intersection of L1 with L2, where the acquisition timing of AE(1) is at t=1.667 ms.

Figure 4B:
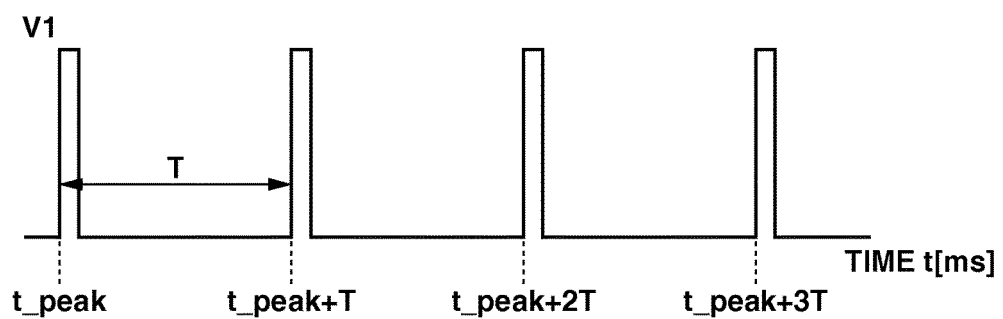

In addition, since the change period T of light intensity of a flickering light source is already known, a synchronization signal V1 is generated, as illustrated in FIG. 4B, at each timing calculated with t=t_peak+n×T where n is a natural number.

Influence of flickering can be reduced by performing exposure in synchronization within synchronization with the synchronization signal V1. In this case, however, there is caused a release time lag of time T at a maximum that is equal to one period of synchronization signal V1. For example, if exposure is performed at a timing of a synchronization signal V1 under a light source that flickers at T=10 ms, a release time lag of 10 ms at a maximum inevitably occurs. Consequently, in a case of a camera having a frame speed of 10 frames per second, an interval between frames may be extended by 10 ms at a maximum. This may cause the frame speed to be slower than 10 frames per second.

Meanwhile, there may exist a case, depending on a flickering light source, where photometric values become approximately the same, other than at the peak timing and the bottom timing, at one half of the change period T of light intensity. In this case, if exposure can be performed in synchronization with the timing at which the photometric values become approximately the same at every T/2 period, a maximum release time lag can be reduced from T to T/2 while reducing the influence of flickering.

A typical flickering light source in which photometric values become approximately the same at every T/2 period is a light source whose intensity fluctuates in a sine wave. Accordingly, the present exemplary embodiment provides a process for determining whether the light intensity of a flickering light fluctuates in a sine wave. In case of sine wave change, exposure is performed in synchronization with the timing at which photometric values become approximately the same at every T/2 period.

Figure 5:
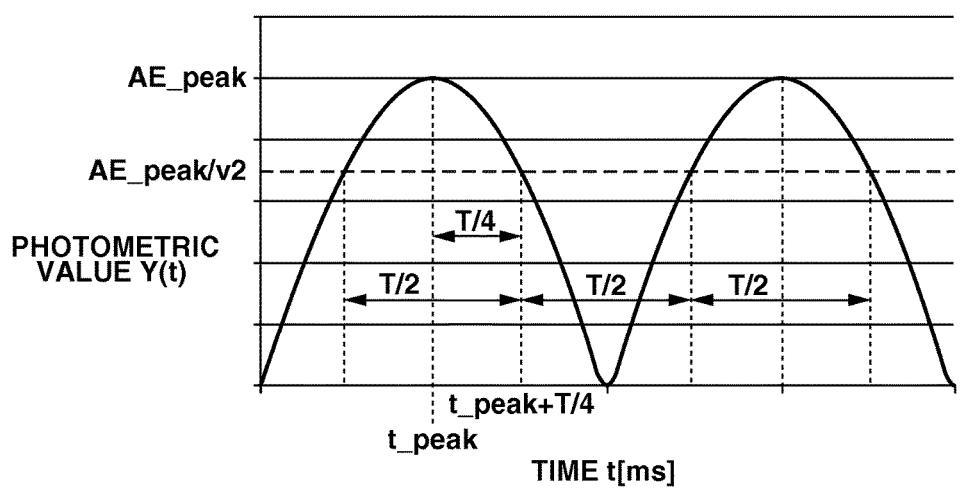
FIG. 5 illustrates photometric values under a flickering light source in which the light intensity fluctuates in a sine wave.

FIG. 5 illustrates photometric values under a flickering light source in which light intensity fluctuates in a sine wave. When the light intensity of a flickering light source fluctuates in a sine wave, a photometric value Y(t) satisfies the following equation:

$$Y(t) = \left| AE\_peak \times \cos\left(\frac{2\pi}{2T \times (t - t\_peak)}\right) \right| \quad (3)$$

where T is a change period T of light intensity_peak is a peak timing, and AE_peak is a peak photometric value at the peak timing t_peak. If light intensity of a flickering light source fluctuates in a sine wave, there exists a timing at which photometric values become approximately the same at every T/2 period as can be seen from FIG. 5 and Equation (3). According to the present exemplary embodiment, a release time lag can be reduced by performing exposure in synchronization with the timing at which photometric values become approximately the same at this T/2 period.

For example, the maximum release time lag can be reduced from 10 ms to 5 ms under a flickering light source where a change period T of light intensity is 10 ms.

Described now will be a method for determining whether light intensity of a flickering light source fluctuates in a sine wave.

Whether light intensity fluctuates in a sign wave can be determined by comparing an actual photometric measurement result AE(n) with Y(t(n)) that is a photometric value when the light intensity is assumed to fluctuate in a sine wave.

For example, if an evaluation value K is defined as a sum of squares of Y(t(n))−AE(n) where n is 1 to 6, the evaluation value K can be obtained with the following Equation (4).

$$K = \sum_{n=1}^{6} (Y(t(n)) - AE(n))^2 \quad (4)$$

The evaluation value K in this equation will be compared with a predetermined threshold value K_th. If K<K_th is satisfied, then the degree of coincidence between Y(t(n)) and AE(n) is high and therefore a change pattern of light intensity of a flickering light source can be determined to follow a sign wave. On the other hand, if K≥K_th is satisfied, then the degree of coincidence between Y(t(n)) and AE(n) is low and therefore a change pattern of light intensity of a flickering light source can be determined not to follow a sign wave.

Methods for determining whether the light intensity of a flickering light source fluctuates in a sine wave is not limited to the above-described method, but known methods for identifying a wave form can be used.

Figure 6:
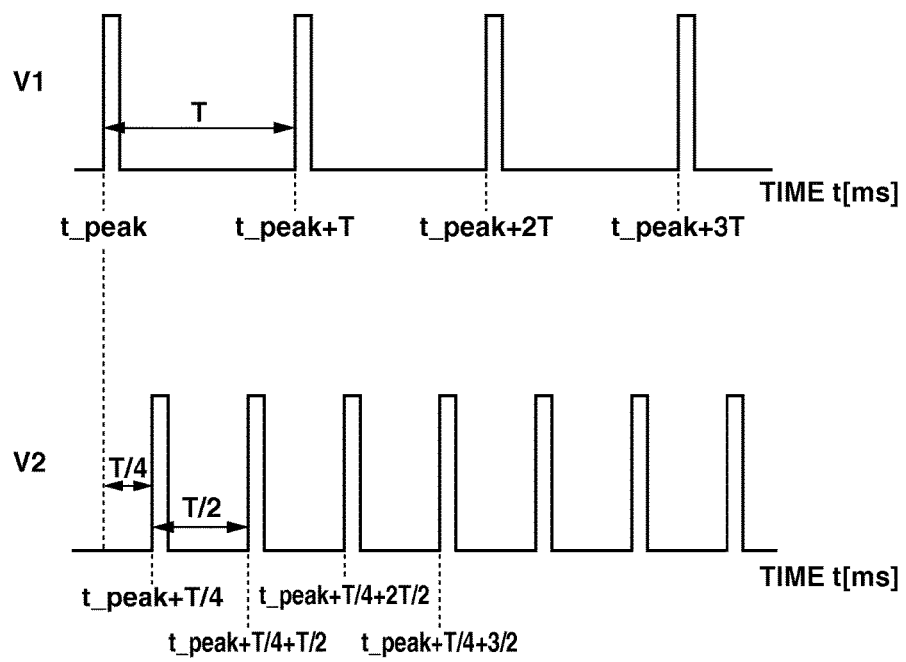
FIG. 6 illustrates a generation timing of a synchronization signal V1 and a synchronization signal V2.

In step S202, if the change pattern of light intensity of a flickering light source is a sine wave, the ICPU 112 generates a synchronization signal V2 that is synchronized with the timing at which the light intensity of the flickering light source becomes approximately the same at every T/2 period as illustrated in FIG. 6.

As illustrated in FIG. 6, the synchronization signal V2 is a signal generated at each T/2 period and synchronized with a timing offset by T/4 from the peak timing T_peak at which the synchronization signal V1 is generated. Therefore, the synchronization signal V2 is generated whenever t=t_peak+ T/4+n*T/2 (n is a natural number).

In step S203, the ICPU 112 subsequently determines the flicker detection result obtained in step S202 (i.e., whether it is under flickering light source). If flickering is not detected in step S203 (i.e., it is determined not to be under a flickering light source) (NO in step S203), then the operation proceeds to step S211 to perform a normal image capturing sequence. If flickering is detected (i.e., it is determined to be under a flickering light source) (YES in step S203), then the operation proceeds to step S204.

In step S204, the ICPU 112 determines whether a shutter speed TV, which has been set as one of exposure conditions, satisfies a predetermined condition. If the shutter speed TV is longer enough as compared to the change period of light intensity of a flickering light source, the change between dark and bright is averaged so that flickering gives almost no infection, if any, on a captured image. Thus, a ratio of shutter speed TV to a change period T of light intensity is compared with a predetermined ratio α that is stored in the memory 102 in advance. If TV/T is larger than α (YES in step S204), the shutter speed TV is determined to be longer enough than the change period T of light intensity, and therefore the influence of flickering is determined to be small enough. In this case, the operation proceeds to step S211 to perform a normal image capturing sequence. On the other hand, if TV/T is equal to or less than α (NO in step S204), the operation proceeds to step S205 to take necessary measures against flickering. In other words, if the ratio of the set exposure time to the change period of light intensity is larger than the predetermined ratio, then the operation proceeds to step S211, and if the ratio of the set exposure time to the change period of light intensity is equal to or smaller than the predetermined ratio, then the operation proceeds to step S205. Incidentally, any other suitable method may be employed for determining whether the shutter speed TV is a shutter speed that can reduce the influence of flickering on a captured image to be enough. For example, the change period T of light intensity has already been calculated in step S202. A predetermined threshold value that corresponds to each of expected change periods of light intensity T may be stored in the memory 102 in advance, and may be determined whether the shutter speed TV is equal to or larger than the stored threshold value that corresponds to a detected change period T of light intensity. More specifically, if a preset exposure period is shorter than the predetermined threshold value, the operation may proceed to step S205, and if the preset exposure period is equal to or longer than the predetermined threshold, the operation may proceed to step S211.

In step S205, the ICPU 112 determines, based on the flicker detection results in step S202, whether exposure can be performed at a timing of each T/2 period. This is determined based on whether the light intensity of a flickering light source fluctuates in a sine wave and whether the light intensity becomes approximately the same at every T/2 period according to the present exemplary embodiment. If the change pattern of light intensity is not a sine wave (NO in step S205), the operation proceeds to step S209 in order to perform exposure in synchronization with the peak timing of the change of light intensity. On the other hand, if the change pattern of light intensity is a sine wave (YES in step S205), the operation proceeds to step S206 in order to perform exposure in synchronization with the timing at which the light intensity becomes approximately the same at every T/2 period.

In step S206, if the CCPU 101 determines that the SW2 is switched on, i.e., the SW2 is in a state where the release button is pressed completely (YES in step S206), the operation proceeds to step S207. In step S207, the CCPU 101 allows the image sensor 103 to perform exposure in synchronization with the synchronization signal V2 generated in step S202. At that time, it is more preferable to control the exposure timing so that the timing at which the synchronization signal V2 is generated becomes the center of an exposure period, rather than to start exposure at the same timing at which the synchronization signal V2 is generated. This is because if the image sensor 103 is exposed at the same timing at which the synchronization signal V2 is generated, the light intensity during the exposure period becomes different depending on a direction in which the light intensity changes after starting the exposure.

In step S207, by performing exposure in synchronization with the timing at which the light intensity of the flickering light source becomes the same at each T/2 period, the release time lag can be reduced and a captured image less influenced by flickering is obtained.

After performing exposure in step S207, the operation proceeds to step S208 and ends the exposure timing determination process. When continuous image capturing is performed, the exposure timing determination process is started again for the next image capturing immediately after the operation proceeds to step S208. Meanwhile, the operation of the exposure timing determination process for the second frame and thereafter in the continuous image capturing may skip step S201 and step S202.

If, in step S205, the change pattern of light intensity is determined not to be a sine wave (NO in step S205), and if the CCPU 101 determines, in step S209, that the SW2 is switched on, i.e., the SW2 is in a state where the release button is pressed completely (YES in step S209), then the operation proceeds to step S210. In step S210, the CCPU 101 allows the image sensor 103 to be exposed in synchronization with the synchronization signal V1 generated in step S202. It is more preferable to control the exposure timing so that the timing at which the synchronization signal V1 is generated becomes the center of the exposure period, rather than to allow the image sensor 103 to start being exposed at the same timing at which the synchronization signal V1 is generated. In this way, the exposure unevenness can be reduced.

In step S210, exposure is performed in synchronization with the timing at which the light intensity of a flickering light source becomes maximum. Although this operation makes the release time lag longer than that by the exposure in step S207, a captured image being less influenced by flickering than that by the exposure in step S207 can be obtained.

If, in step S204, if it is determined that the shutter speed is a shutter speed at which influence of flickering on a captured image will be small enough (YES in step S204), and if the CCPU 101 determines, in step S211, that the SW2 is switched on, i.e., the SW2 is in a state where the release button is pressed completely (YES in step S209), then the operation proceeds to step S212. In step S212, the CCPU 101 allows the image sensor 103 to be exposed without taking into account the change of light intensity of a flickering light source (i.e., without synchronizing with the synchronization signal V1 or V2). Therefore, in step S212, the exposure is performed without waiting for the timing of the change of light intensity of a flickering light source and therefore the release time lag can be reduced as compared to the exposure in step S207 or in step S210.

As described above, in the present exemplary embodiment, the exposure is performed in synchronization with the timing at which the light intensity becomes the same at every T/2 period in a case where a light source flickers in a sine wave and the shutter speed is a speed at which a captured image will be influenced by the flickering. However, the exposure unevenness within a single captured image becomes greater, when exposure is performed in synchronization with the timing at which the light intensity of a flickering light source becomes the same at every T/2 period, than synchronizing with the timing at which the light intensity of the flickering light source becomes maximum. Therefore, if it is determined that the image is influenced by a flicker at the shutter speed, it may further be determined whether the shutter speed is a shutter speed at which the exposure unevenness in the single captured image is small enough. If the shutter speed is such, exposure may be performed as in step S207. In this case, exposure unevenness between a plurality of images captured by a plurality of times of image capturing can be reduced under a flickering light source.

In addition, the exposure unevenness does not occur within a single image if a global shutter system is employed instead of a rolling shutter system. This is because the global shutter system electronically synchronizes exposure timing for all the portions in the imaging area of the image sensor 103. Therefore, the CCPU 101 may be configured to switch between the rolling shutter system (a first exposure mode) and the global shutter system (a second exposure mode). When the global shutter mode is used, exposure may be performed as in step S207.

In the first exemplary embodiment of the present inventions, the exposure timing under a typical light source which flickers in a sine wave has been described. Light sources have become more diversified recently since illumination using light-emitting diodes (LEDs) has been introduced. In a second exemplary embodiment, an example which can be applied to light sources other than the light sources that flicker in a sine wave. In the second exemplary embodiment, the major components are similar to those in the first exemplary embodiment, which have been described with reference to FIG. 1. In addition, and the operation of the exposure timing determination process is similar to that described in the first exemplary embodiment with reference to FIG. 2, a description thereof will not be repeated here.

A difference from the first exemplary embodiment resides in a process performed in step S202 in the present exemplary embodiment. More specifically, a difference resides in an operation for determining whether a point at which photometric values become approximately the same at every T/2 period. Now, this difference will be described in detail.

In step S202, it is determined whether a point exists at which photometric values become approximately the same at every T/2 period. Although other flicker detection operations and flicker detection calculations are performed in step S202, a method for determining a change period T of the light intensity or a method for detecting a peak timing is similar to that in the first exemplary embodiment, a description thereof will not be repeated here.

An operation for determining flickering of the light intensity will now be described with reference to FIG. 7. FIG. 7 illustrates photometric values under a flickering light source in which the light intensity fluctuates at T=10 ms in a triangular wave pattern.

The ICPU 112 calculates T/2 from a change period T of the light intensity. T is 10 ms and therefore T/2 is calculated as 5 ms. Now, a charge accumulation period used for flicker detection is 1.66 ms so that a period of T/2 equals to that of three photometric measurements.

Consequently, whether there exists a point at which photometric values become approximately the same at every T/2 period depends on whether there exists an n value with which AE(n) and AE(n+3) become approximately the same in photometric values from AE(1) to AE(6).

More specifically, it will be determined whether there exists the n value with which |AE(n)−AE(n+3)| is equal to or smaller than a predetermined threshold value Th where n is 1 to 3. In a case where there exist a plurality of n values, the n value with which |AE(n)−AE(n+3)| becomes minimum can be employed. In a case where there is not such an n value with which |AE(n)−AE(n+3)| becomes equal to or lower than the threshold value Th, then it is determined that no point at which photometric values become approximately the same at every T/2 period exists.

In an example illustrated in FIG. 7, n=2 is employed as a value with which |AE(n)−AE(n+3)| becomes equal to or lower than the predetermined threshold value Th. The ICPU 112 subsequently generates a synchronization signal that synchronizes with a timing that photometric values become approximately the same at every T/2 period. The photometric values become approximately the same at n=2 so that the synchronization signal V2 is generated at every timing of t=t2+m×T/2, where m is a natural number.

The operation described above enables determination of whether there exist a point at which photometric values become approximately the same at every T/2 period, even if the wave form of flickering light is not a sine wave. Moreover, if there exists a point at which photometric values become approximately the same at every T/2 period, the exposure performed in synchronization with the synchronization signal V2 enables the influence of flickering and the amount of release time lag to be reduced.

In addition, an modification such as that applied to the first exemplary embodiment can also be applied to the present exemplary embodiment.

While preferred embodiments of the present inventions has been described, it is to be understood that the present inventions are not limited thereto, and various modifications and changes can be made within the gist of the inventions.

For example, while the ICPU 112 calculates both photometric measurement results and change characteristics of the light from a subject based on output signals (i.e., image signals) from photometric sensor 108 in the above exemplary embodiments, a photometric sensor and a sensor for measuring the change characteristics may separately be equipped.

Exemplary embodiments of the present inventions can also be realized by executing the following process. That is, a software program that can implement the functions of the above mentioned exemplary embodiments is supplied to a system or a device via a network or various storage media, and a computer (or CPU or MPU) of the system or the device reads out and executes the program.

According to the exemplary embodiments of the present inventions, satisfactory images can be obtained even if images are captured under a light source which flickers, while preventing a frame speed from decreasing during consecutive image capturing.

Other Embodiments

Embodiment(s) of the present inventions can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-161758, filed Aug. 7, 2014, which is hereby incorporated by reference herein in its entirety.

What is claimed is:

1. An imaging apparatus comprising:
   an image capturing sensor; and at least one processor that operates to: acquire information about a periodic change in light intensity from a subject or an object; and control exposure timing of the image capturing sensor to the light, wherein, when consecutive image capturing is performed and each of image capturing processes of the consecutive image capturing is performed, the at least one processor controls exposure timing of the image capturing sensor so that the image capturing sensor is exposed in synchronization with a first timing at which the light intensity from the subject or the object becomes a first light intensity based on the information acquired, wherein a first period which is a time period between two successive time periods in each of which the light intensity becomes the first light is shorter than a change period of the light intensity from the subject or the object based on the information acquired, and wherein the first timing is a timing other than a timing at which the light intensity that is periodically changed becomes maximum or minimum.

2. The imaging apparatus according to claim 1, wherein the first period is a half of the change period of the light intensity from the subject or the object based on the information acquired.

3. The imaging apparatus according to claim 1, wherein the at least one processor controls the exposure timing of the image capturing sensor so that the first timing matches a center in an exposure period of the image capturing sensor.

4. The imaging apparatus according to claim 1, wherein the at least one processor controls the exposure timing of the image capturing sensor so that the image capturing sensor is exposed in synchronization with a second timing at which the light intensity from the subject or the object becomes a second light intensity based on the information acquired in a case where the light intensity from the subject or the object does not become equal at every half of the change period of the light intensity from the subject or the object based on the information acquired, wherein a second period of time between a plurality of the second timings being successive is equal to the change period of the light intensity from the subject or the object based on the information acquired, and wherein the second timing is a timing at which the light intensity that is periodically changed becomes maximum or minimum.

5. The imaging apparatus according to claim 1, wherein, when the consecutive image capturing is performed and a set exposure period of the image capturing sensor is longer than a predetermined period, the at least one processor controls the exposure timing of the image capturing sensor so that the image capturing sensor is exposed without synchronizing with the first timing, and wherein, when the consecutive image capturing is performed and the set exposure period of the image capturing sensor is not longer than the predetermined period, the at least one processor controls the exposure timing of the image capturing sensor so that the image capturing sensor is exposed in synchronization with the first timing.

6. The imaging apparatus according to claim 1, wherein the at least one processor is configured to switch between a first exposure mode in which portions of an imaging area of the image capturing sensor are exposed with different exposure timings, and a second exposure mode in which all portions of the imaging area of the image capturing sensor are exposed with a same timing, and wherein, when the consecutive image capturing is performed and the second exposure mode is used, the at least one processor controls the exposure timing of the image capturing sensor so that the image capturing sensor is exposed in synchronization with the first timing.

7. A control method of an imaging apparatus, comprising:

acquiring information about a periodic change in light intensity from a subject or an object; and controlling exposure timing of an image capturing sensor of the imaging apparatus, wherein, when consecutive image capturing is performed and each of image capturing processes of the consecutive image capturing is performed, exposure timing of the image capturing sensor is controlled so that the image capturing sensor is exposed in synchronization with a first timing at which the light intensity from the subject or the object becomes a first light intensity based on the acquired information about the periodic change in light intensity from the subject or the object, wherein a first period which is a time period between two successive time periods in each of which the light intensity becomes the first light intensity is shorter than a change period of the light intensity from the subject or the object based on the acquired information about the periodic change in light intensity from the subject or the object, and wherein the first timing is a timing other than a timing at which the light intensity that is periodically changed becomes maximum or minimum.

8. A non-transitory computer readable storage medium storing a program for causing a computer to perform a control method of an imaging apparatus, the control method comprising:

acquiring information about a periodic change in light intensity from a subject or an object; and controlling exposure timing of an image capturing sensor of the imaging -4 apparatus, wherein, when consecutive image capturing is performed and each of image capturing processes of the consecutive image capturing is performed, exposure timing of the image capturing sensor is controlled so that the image capturing sensor is exposed in synchronization with a first timing at which the light intensity from the subject or the object becomes a first light intensity based on the acquired information about the periodic change in light intensity from the subject or the object, wherein a first period which is a time period between two successive time periods in each of which the light intensity becomes the first light intensity is shorter than a change period of the light intensity from the subject or the object based on the acquired information about the periodic change in light intensity from the subject or the object, and wherein the timing at which the light intensity becomes the first light intensity is a timing other than a timing at which the light intensity that is periodically changed becomes maximum or minimum.

9. The imaging apparatus according to claim 2, wherein the image capturing sensor is driven by a global shutter system.

10. The imaging apparatus according to claim 1, wherein the first period indicates a time length of one cycle during which the first light intensity changes and changes back to the first light intensity again in the periodic change in the light intensity from the subject or the object.

11. An imaging apparatus comprising:

an image capturing sensor; and at least one processor that operates to:

acquire information about a periodic change in light intensity from a subject or an object; and control exposure timing of the image capturing sensor to the light, wherein, when consecutive image capturing is performed and each of image capturing processes of the consecutive image capturing is performed, the at least one processor controls exposure timing of the image capturing sensor so that the image capturing sensor is exposed in synchronization with a first timing at which the light intensity from the subject or the object becomes a first light intensity based on the information acquired, wherein a period which is a time period between two successive time periods in each of which the light intensity becomes the first light intensity is shorter than a change period of the light intensity from the subject or the object based on the information acquired, wherein the first timing is a timing other than a timing at which the light intensity that is periodically changed becomes maximum or minimum, wherein, when the consecutive image capturing is performed and a set exposure period of the image capturing sensor is longer than a predetermined period, the at least one processor controls the exposure timing of the image capturing sensor so that the image capturing sensor is exposed without synchronizing with the first timing, and wherein, when the consecutive image capturing is performed and the set exposure period of the image capturing sensor is not longer than the predetermined period, the at least one processor controls the exposure timing of the image capturing sensor so that the image capturing sensor is exposed in synchronization with the first timing.

12. The imaging apparatus according to claim 11, wherein the period during which the light intensity from the subject or the object becomes the first light intensity is a half of the change period of the light intensity from the subject or the object based on the information acquired.

13. The imaging apparatus according to claim 11, wherein the at least one processor controls the exposure timing of the image capturing sensor so that the first timing matches a center in an exposure period of the image capturing sensor.

14. The imaging apparatus according to claim 11, wherein the at least one processor controls the exposure timing of the image capturing sensor so that the image capturing sensor is exposed in synchronization with a second timing at which the light intensity from the subject or the object becomes a second light intensity based on the information acquired in a case where the light intensity from the subject or the object does not become equal at every half of the change period of the light intensity from the subject or the object based on the information acquired, wherein a period during which the light intensity from the subject or the object becomes the second light intensity is equal to the change period of the light intensity from the subject or the object based on the information acquired, and wherein the second timing is a timing at which the light intensity that is periodically changed becomes maximum or minimum.

15. The imaging apparatus according to claim 11, wherein the at least one processor is configured to switch between a first exposure mode in which portions of an imaging area of the image capturing sensor are exposed with different exposure timings, and a second exposure mode in which all portions of the imaging area of the image capturing sensor are exposed with a same timing, and wherein, when the consecutive image capturing is performed and the second exposure mode is used, the at least one processor controls the exposure timing of the image capturing sensor so that the image capturing sensor is exposed in synchronization with the first timing.

16. The imaging apparatus according to claim 12, wherein the image capturing sensor is driven by a global shutter system.

17. A control method of an imaging apparatus, comprising:

acquiring information about a periodic change in light intensity from a subject or an object; and controlling exposure timing of the image capturing sensor to the light, wherein, when consecutive image capturing is performed and each of image capturing processes of the consecutive image capturing is performed, exposure timing of the image capturing sensor is controlled so that the image capturing sensor is exposed in synchronization with a first timing at which the light intensity from the subject or the object becomes a first light intensity based on the acquired information about the periodic change in light intensity from the subject or the object, wherein a period which is a time period between two successive time periods in each of which the light intensity becomes the first light intensity is shorter than a change period of the light intensity from the subject or the object based on the acquired information about the periodic change in light intensity from the subject or the object, wherein the first timing is a timing other than a timing at which the light intensity that is periodically changed becomes maximum or minimum, wherein, when the consecutive image capturing is performed and a set exposure period of the image capturing sensor is longer than a predetermined period, the exposure timing of the image capturing sensor is controlled so that the image capturing sensor is exposed without synchronizing with the first timing, and wherein, when the consecutive image capturing is performed and the set exposure period of the image capturing sensor is not longer than the predetermined period, the exposure timing of the image capturing sensor is controlled so that the image capturing sensor is exposed in synchronization with the first timing.

18. The control method according to claim 17, wherein the period during which the light intensity from the subject or the object becomes the first light intensity is a half of the change period of the light intensity from the subject or the object based on the information acquired.

19. A non-transitory computer readable storage medium storing a program for causing a computer to perform a control method of an imaging apparatus, the control method comprising:

acquiring information about a periodic change in light intensity from a subject or an object; and controlling exposure timing of the image capturing sensor to the light, wherein, when consecutive image capturing is performed and each of image capturing processes of the consecutive image capturing is performed, exposure timing of the image capturing sensor is controlled so that the image capturing sensor is exposed in synchronization with a first timing at which the light intensity from the subject or the object becomes a first light intensity based on the acquired information about the periodic change in light intensity from the subject or the object, wherein a period which is a time period between two successive time periods in each of which the light intensity becomes the first light intensity is shorter than a change period of the light intensity from the subject or the object based on the acquired information about the periodic change in light intensity from the subject or the object, wherein the first timing is a timing other than a timing at which the light intensity that is periodically changed becomes maximum or minimum, wherein, when the consecutive image capturing is performed and a set exposure period of the image capturing sensor is longer than a predetermined period, the exposure timing of the image capturing sensor is controlled so that the image capturing sensor is exposed without synchronizing with the first timing, and wherein, when the consecutive image capturing is performed and the set exposure period of the image capturing sensor is not longer than the predetermined period, the exposure timing of the image capturing sensor is controlled so that the image capturing sensor is exposed in synchronization with the first timing.

20. The non-transitory computer readable storage medium according to claim 19, wherein the period during which the light intensity from the subject or the object becomes the first light intensity is a half of the change period of the light intensity from the subject or the object based on the information acquired.

* * * * *